(12) United States Patent
Han et al.

(10) Patent No.: US 11,353,923 B2
(45) Date of Patent: Jun. 7, 2022

(54) HEAD MOUNTING DEVICE

(71) Applicant: Samsung Electronics Co., Ltd., Gyeonggi-do (KR)

(72) Inventors: Jae-Uk Han, Gyeonggi-do (KR); Sung-Min Kim, Gyeonggi-do (KR)

(73) Assignee: Samsung Electronics Co., Ltd

( * ) Notice: Subject to any disclaimer, the term of this patent is extended or adjusted under 35 U.S.C. 154(b) by 98 days.

(21) Appl. No.: 16/760,670

(22) PCT Filed: Oct. 16, 2018

(86) PCT No.: PCT/KR2018/012124
§ 371 (c)(1),
(2) Date: Apr. 30, 2020

(87) PCT Pub. No.: WO2019/088501
PCT Pub. Date: May 9, 2019

(65) Prior Publication Data
US 2020/0257333 A1    Aug. 13, 2020

(30) Foreign Application Priority Data
Nov. 3, 2017  (KR) .......................... 10-2017-0146185

(51) Int. Cl.
*G06F 1/16*    (2006.01)
(52) U.S. Cl.
CPC .................................... *G06F 1/163* (2013.01)
(58) Field of Classification Search
CPC ...................................................... G06F 1/163
See application file for complete search history.

(56) References Cited

U.S. PATENT DOCUMENTS 10,045,449 B1 *  8/2018  Yee ........................ A61F 9/025
2015/0219901 A1 *  8/2015  Morimoto .......... G02B 27/0176
345/8

(Continued)

FOREIGN PATENT DOCUMENTS

| KR | 1020150060698 | 6/2015 |
| KR | 2020160003517 | 10/2016 |

(Continued)

OTHER PUBLICATIONS

PCT/ISA/210 Search Report issued on PCT/KR2018/012124, pp. 5.
PCT/iSA/237 Written Opinion issued on PCT/KR2018/012124, pp. 5.

*Primary Examiner* — Kent W Chang
*Assistant Examiner* — Chayce R Bibbee
(74) *Attorney, Agent, or Firm* — The Farrell Law Firm, P.C.

(57) ABSTRACT

According to various embodiments of the present invention, a head mounting device (HMD) may comprise: a facial wearing part which is worn on a user's face and outputs an image to both of a user's eyes; a wearing band part mounted on an upper side of the facial wearing part; and a support part which is mounted on the wearing band part to support a user's head, wherein the facial wearing part may comprise a housing in which an optical device is disposed, a guide member which extends over a first surface of the housing and is formed corresponding to a contour of the user's face, and a fixing plate which is mounted on the housing with a part of the guide member interposed between the fixing plate and the housing so as to fix the guide member to the housing. The head mounting device as mentioned above can be various according to embodiments.

14 Claims, 9 Drawing Sheets

(56) References Cited

U.S. PATENT DOCUMENTS

| | | |
|---|---|---|
| 2017/0055079 A1* | 2/2017 | Yang .................... H04R 5/0335 |
| 2017/0153672 A1* | 6/2017 | Shin ................... G02B 27/0176 |
| 2017/0019235 A1 | 7/2017 | Petrov |
| 2017/0205886 A1 | 7/2017 | Wan et al. |
| 2017/0266554 A1 | 9/2017 | Marks et al. |
| 2017/0269685 A1 | 9/2017 | Marks |
| 2017/0282062 A1 | 10/2017 | Black |

FOREIGN PATENT DOCUMENTS

| | | |
|---|---|---|
| KR | 101697459 | 1/2017 |
| KR | 1020170062876 | 6/2017 |

\* cited by examiner

HEAD MOUNTING DEVICE

PRIORITY

This application is a National Phase Entry of PCT International Application No. PCT/KR2018/012124, which was filed on Oct. 16, 2018, and claims priority to Korean Patent Application No. 10-2017-0146185, which was filed on Nov. 3, 2017, the content of each of which is incorporated herein by reference.

TECHNICAL FIELD

Various embodiments of the disclosure relate to an electronic device, for example, a wearable electronic device.

BACKGROUND ART

Along with the development of electronic and communication technologies, electronic devices have become so small and lightweight as to be wearable on users without great inconvenience. An electronic device wearable on a user's body or in the form of clothing includes a head mounted device (HMD), smart glasses, a smart watch (or band), a contact lens-type device, a ring-type device, and a clothing/shoes/glove-type device. Such a wearable electronic device is easy to carry and may improve user accessibility.

An 'HMD' is a device worn on a user's head or face, for use. HMDs are classified into a see-through type that provides augmented reality (AR) and a see-closed type that provides virtual reality (VR). A see-through type-HMD may be implemented, for example, in the form of glasses and provide a user with information such as information about buildings and objects within the user's field of view in the form of an image or text. A see-closed-type HMD may output independent images to both eyes of an individual user and may also provide content (for example, a game, a movie, streaming, or broadcasting) received from a mobile communication terminal or from the outside as a video or audio, thereby offering excellent immersiveness.

DETAILED DESCRIPTION OF THE INVENTION

Technical Problem

Since the see-closed-type head-mounted device (hereinafter referred to as "HMD") is used while being worn on the user's head or face, a mounted electronic device (for example, a mobile communication terminal) or an embedded display panel may be located fairly close to both eyes of the user. The user's eyesight may be limited in stably viewing a screen at such a close distance. Accordingly, the HMD may include an optical device between the user's eyes and a display panel (or an attached mobile communication terminal), so that the user may easily view a screen at a very close distance.

However, as the optical device or the like is mounted on the HMD, the weight of the HMD increases, and thus the user may easily become fatigued when wearing the HMD for a long time. Because the HMD includes a structure for providing an output screen to both eyes of the user (for example, the optical device, a structure for mounting and fixing the optical device, and so on), a structure for blocking images (an ambient image) other than an output screen, a display panel (or mobile communication terminal) for outputting a screen, an audio device (for example, a speaker module), and so on, there may be limitations in reducing the weight of the HMD. For example, although the user's fatigue may be reduced by reducing the weight of the HMD, there may be a limit in dramatically reducing the weight of the HMD.

Various embodiments of the disclosure may provide an HMD which a user is easily adjustable a wearing state of the HMD, for example, the user is easily adjustable the center of gravity of the HMD, thereby relieving the user's fatigue or improving wearing comfort.

Various embodiments of the disclosure may provide an HMD which may reduce a weight sensed by a user by distributing parts of the user's body (for example, head) to which load (for example, weight) is imposed.

Various embodiments of the disclosure may provide an HMD having a robust mounting structure which mitigates pressure applied to a user's face.

Technical Solution

According to various embodiments of the disclosure, a head mounted device (HMD) may include a face-worn unit worn on a user's face and configured to output an image to both eyes of the user, a wearing band unit mounted above the face-worn unit, and a support unit mounted to the wearing band unit and supported by the user's head.

The face-worn unit may include a housing including an optical device disposed therein, a guide member extended from a first surface of the housing and formed in correspondence with the contour of the user's face, and a fixing plate mounted to the housing, with a part of the guide member in between, and configured to fix the guide member to the housing.

According to various embodiments of the disclosure, the face-worn unit may further include a first cushioning member mounted to the guide member, and the first cushioning member may contact and be supported by the user's face in a worn state.

According to various embodiments of the disclosure, an HMD may include a face-worn unit worn on a user's face and configured to output an image to both eyes of the user, a wearing band unit mounted above the face-worn unit, and a support unit mounted to the wearing band unit and supported by the user's head.

The wearing band unit may include a frame member, a control device engaged with the frame member to form a closed curve along with the frame member, and a speaker module mounted on an outer surface of the frame member.

A wiring recess may be formed on one side surface of the frame member, and a cover member may be mounted on the wiring recess.

According to various embodiments of the disclosure, an HMD may include a face-worn unit worn on a user's face and configured to output an image to both eyes of the user, a wearing band unit mounted above the face-worn unit, a support unit mounted to the wearing band unit and supported by the user's head, and a flexible shielding member disposed in correspondence with the user's nose, under the face-worn unit.

The flexible shielding member may include a curved portion and a plurality of flap portions extended toward each other from the curved portion.

The plurality of flap portions may be extended to positions at which the flap portions are close to each other, and form a slit therebetween.

Advantageous Effects

According to various embodiments of the disclosure, a face-worn unit includes a fixing plate that mounts and fixes a guide member configured in correspondence with the contour of a user's face in a housing, thus providing a robust structure. According to various embodiments of the disclosure, wearing comfort may be offered to the user because the guide member is provided with a first cushioning member contacting and supported by the user's face. According to various embodiments of the disclosure, as a support is supported by the user's head above the user's face, the support may distribute load caused by the weight of a head-mounted device (HMD). For example, the load imposed on the user who wears the HMD is distributed, thereby offering comfortable wearing sensation and relieving the user's fatigue.

MODE FOR CARRYING OUT THE INVENTION

Embodiments of the disclosure will be described herein below with reference to the accompanying drawings. However, the embodiments of the disclosure are not limited to the specific embodiments and should be construed as including all modifications, changes, equivalent devices and methods, and/or alternative embodiments of the present disclosure.

Ordinal terms such as "first" or "second" may be used to describe, not limiting, various components. These expressions are used to distinguish one component from another component. For example, a first component may be referred to as a second component, and vice versa without departing from the scope of the disclosure. The term "and/or" includes one or a combination of two or more of a plurality of enumerated items.

Relative terms described with respect to what is seen in the drawings, such as "front surface", "rear surface", "top surface", and "bottom surface" may substitute for ordinal numbers such as "first" and "second". The sequence of ordinal numbers such as "first" and "second" is determined in a mentioned order or an arbitrary order, and may be changed arbitrarily when needed.

The terms as used in the disclosure are provided to merely describe specific embodiments, not intended to limit the scope of the disclosure. It is to be understood that singular forms include plural referents unless the context clearly dictates otherwise. In the disclosure, the term "include" or "have" signifies the presence of a feature, number, operation, component, part, or a combination thereof described in the disclosure, not excluding the presence or one or more other features, numbers, operations, components, parts, or a combination thereof.

Unless otherwise defined, the terms and words including technical or scientific terms used herein may have the same meanings as generally understood by those skilled in the art. The terms as generally defined in dictionaries may be interpreted as having the same or similar meanings as or to contextual meanings of related technology. Unless otherwise defined, the terms should not be interpreted as ideally or excessively formal meanings.

In the disclosure, the electronic device may be an arbitrary device including a touch panel, and the electronic device may be referred to as a terminal, a portable terminal, a mobile terminal, a communication terminal, a portable communication terminal, a portable mobile terminal, and a display device.

For example, the electronic device may be a smartphone, a portable phone, a navigation device, a gaming device, a TV, a head unit for a vehicle, a notebook computer, a laptop computer, a tablet computer, a personal media player (PMP), and a person digital assistant (PDA). The electronic device may be implemented as a portable communication terminal of a pocket size, which has a wireless communication function. Further, the electronic device may be a flexible device or a flexible display device.

The electronic device may communicate with an external electronic device, such as a server, and may perform an operation in conjunction with an external electronic device. For example, the electronic device may transmit an image captured by a camera or location information detected by a sensor unit, to a server through a network. The network is not limited thereto, but may be a mobile or cellular communication network, a local area network (LAN), a wireless local area network (WLAN), a wide area network (WAN), the internet, and a small area network (SAN).

Figure 1:
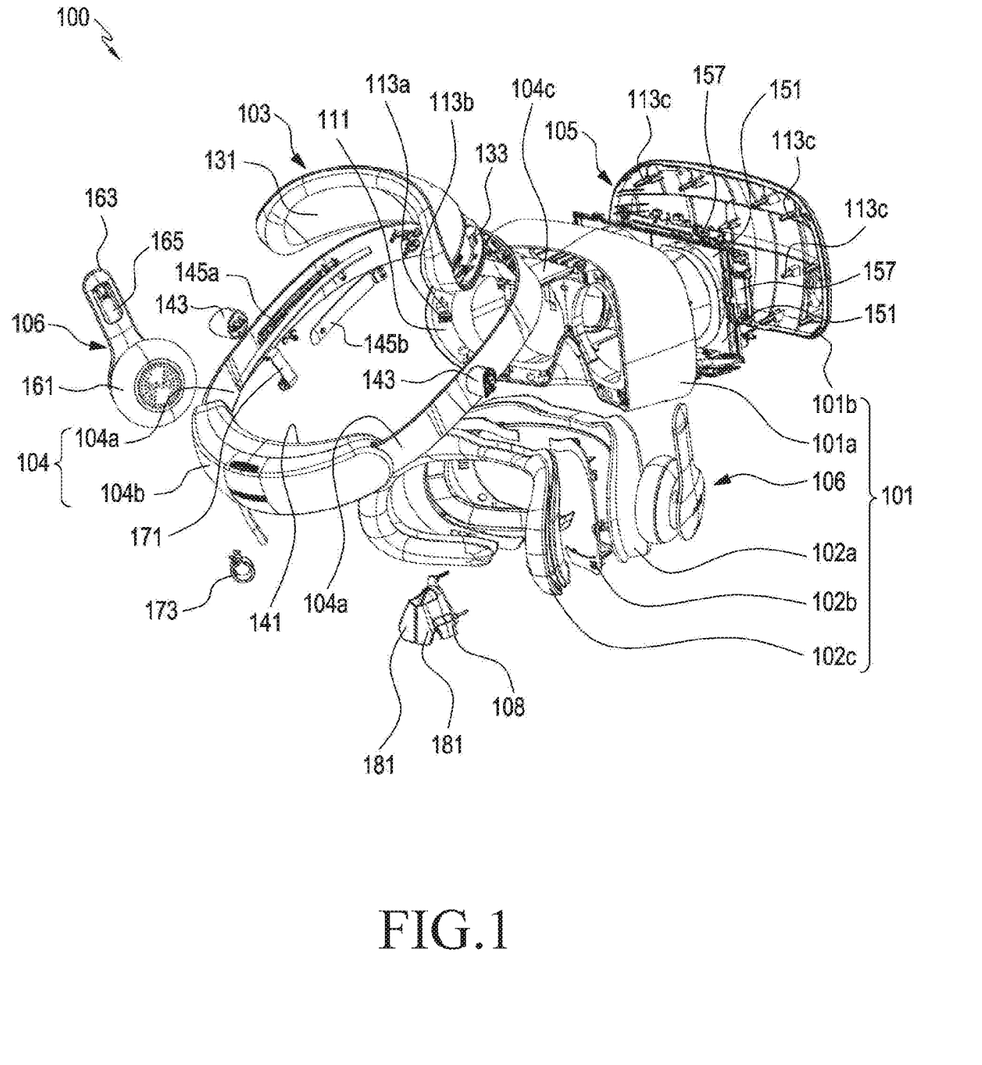
FIG. 1 is an exploded perspective view illustrating a head-mounted device (HMD) according to various embodiments of the disclosure.
Figure 2:
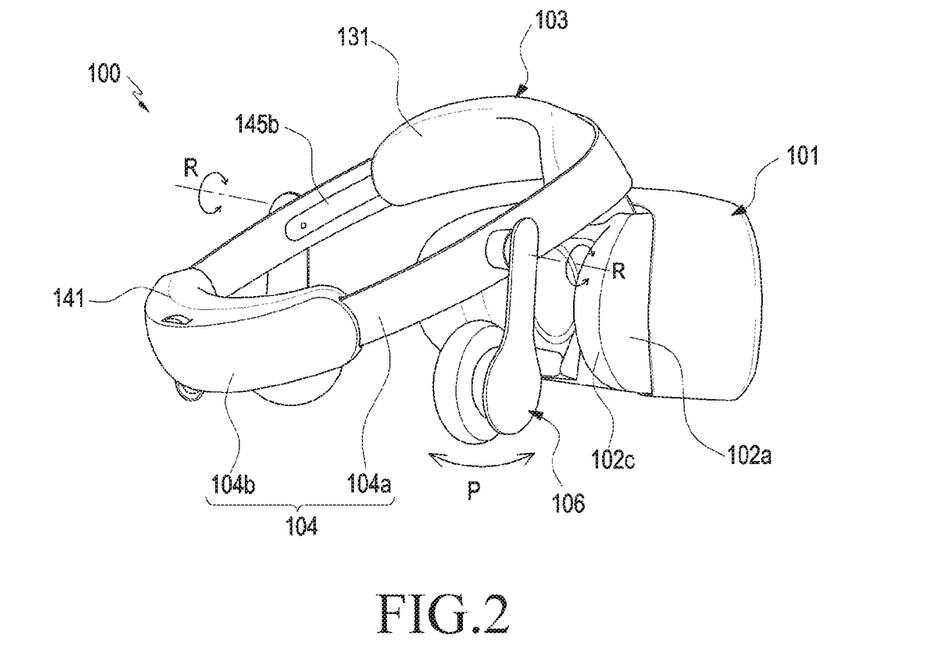
FIG. 2 is an assembled perspective view illustrating an HMD according to various embodiments of the disclosure.
Figure 3:
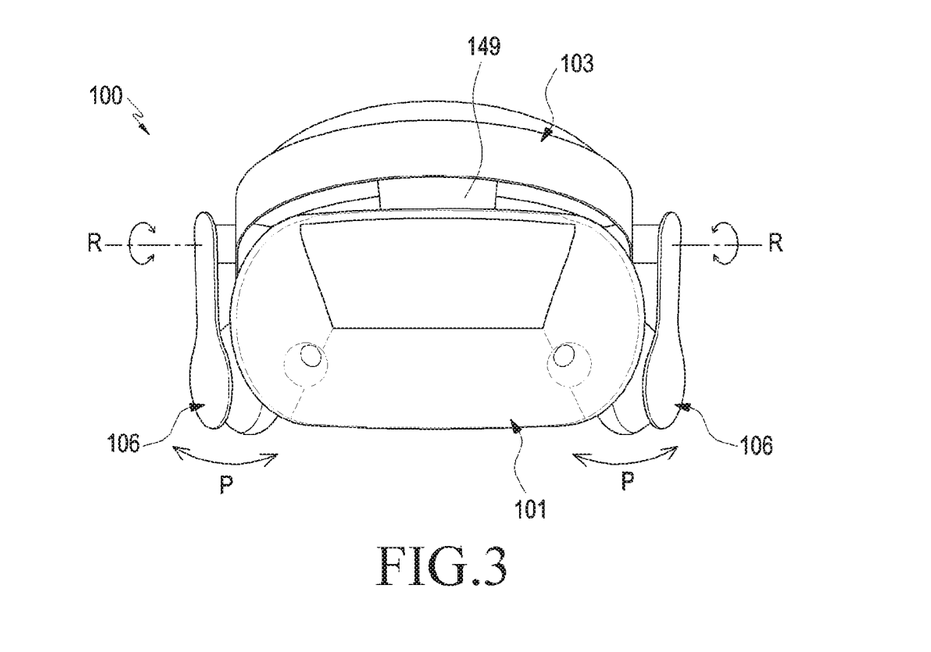
FIG. 3 is a front view illustrating an HMD according to various embodiments of the disclosure.
Figure 4:
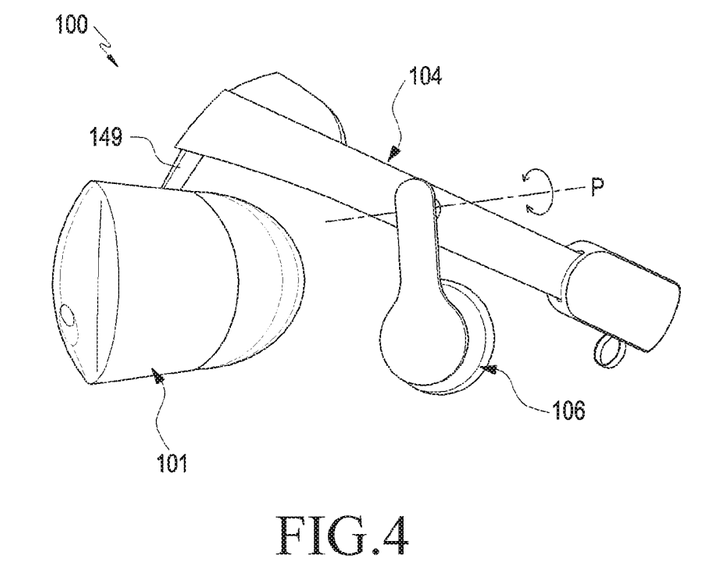
FIG. 4 is a side view illustrating an HMD according to various embodiments of the disclosure.
Figure 5:
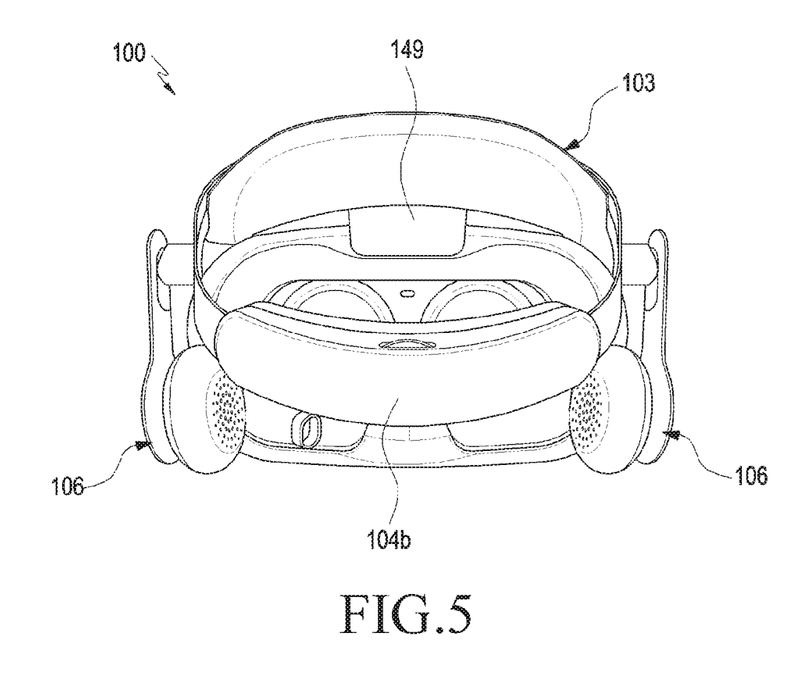
FIG. 5 is a rear view illustrating an HMD according to various embodiments of the disclosure.

FIG. 1 is an exploded perspective view illustrating a head-mounted device (HMD) 100 according to various embodiments of the disclosure. FIG. 2 is an assembled perspective view illustrating the HMD 100 according to various embodiments of the disclosure. FIG. 3 is a front view illustrating the HMD 100 according to various embodiments of the disclosure. FIG. 4 is a side view illustrating the HMD 100 according to various embodiments of the disclosure. FIG. 5 is a rear view illustrating the HMD 100 according to various embodiments of the disclosure.

Referring to FIGS. 1 to 5, the HMD 100 according to various embodiments of the disclosure may include a face-worn unit 101, a wearing band unit 104, and a support unit 103. The face-worn unit 101 may include a guide member 102*a* and a fixing plate 102*b*. The fixing plate 102*b* may tightly fix the guide member 102*a* to a housing 101*a*, and the guide member 102*a* or a later-described first cushioning member 102*c* in the face-worn unit 101 may provide a comfortable wearing sensation to the user.

According to various embodiments of the disclosure, while the HMD 100 is worn, the face-worn unit 101 may be located in correspondence with the user's face, for example, both eyes of the user. According to an embodiment of the disclosure, the face-worn unit 101 may output an image to the eyes of the user. For example, the face-worn unit 101 may include a display panel 151 or an optical device 105 (for example, an optical device of FIG. 8), and the optical device 105 may include lens tubes (for example, lens tubes 153 in FIG. 8) corresponding to both eyes of the user, so that the left/right eye of the user may perceive an image output from the display panel through each independent path (for example, each lens tube).

According to a specific embodiment of the disclosure, the face-worn unit 101 is disclosed as having a built-in display panel, which should not be construed as limiting the disclosure. For example, the face-worn unit 101 may not have the built-in display panel. Instead, an electronic device with a display device mounted thereon, such as a mobile communication terminal may be provided detachably to the face-worn unit 101. According to an embodiment of the disclosure, when the electronic device is mounted on the face-worn unit 101, the display device (for example, the display device mounted in the electronic device) may be located facing both eyes of the user, with the optical device 105 in between. The electronic device may play multimedia content preserved in it (or received from an external electronic device) and provide an output screen to both eyes of the user through the optical device 105.

Figure 8:
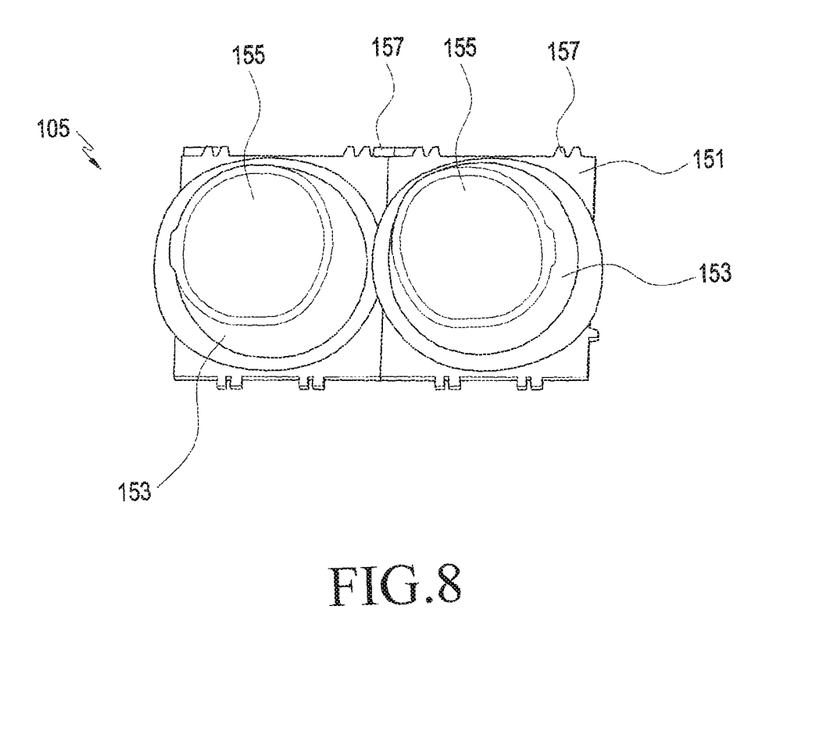
FIG. 8 is a perspective view illustrating an optical device in an HMD according to various embodiments of the disclosure.

FIG. 8 is a perspective view illustrating the optical device 105 in the HMD according to various embodiments of the disclosure.

With further reference made to FIG. 8, the above optical device 105 may be mounted on the display panel 151, and include a pair of lens tubes 153 and at least one lens 155 mounted on the lens tubes 153. The type and number of lenses 155 provided to the lens tubes 153 may be designed and combined in consideration of the distance between the user's eyes and the display panel 151 (or the display device of the mounted electronic device). According to an embodiment of the disclosure, each lens tube 153 may be disposed in correspondence with one of the left and right eyes of the user to guide an image output from the display panel 151 to the eye of the user. In some embodiments of the disclosure, a plurality of display panels 151 may be arranged in correspondence with the lens tubes 153, respectively.

While not shown, at least one circuit board may be mounted on the optical device 105 or the display panel 151. In some embodiments of the disclosure, the circuit board may include a video signal processor, an audio signal processor, and so on, and these processors may drive and control the display panel 151 or speaker module(s) 161 according to a video signal or audio signal received from the outside.

Referring back to FIGS. 1 to 5, the face-worn unit 101 may include the housing 101*a*, the guide member 102*a*, and the fixing plate 102*b*.

According to various embodiments of the disclosure, the housing 101*a* may include a first surface facing the user's face, and a second surface opposite to the first face. The housing 101*a* may include at least one through hole penetrating from the first surface through the second surface, and the optical device 105, for example, the lens tube(s) 153 may be accommodated in the through hole(s). For example, the optical device 105 may be disposed and mounted on the second surface of the housing 101*a* and the lens tube(s) 153 may be disposed at least partially inside the through hole(s). According to an embodiment of the disclosure, the face-worn unit 101 may further include a front cover 101*b* mounted on the second surface of the housing 101*a*, and the optical device 105 (and/or the display panel 151) may be covered by the front cover 101*b*.

According to an embodiment of the disclosure, at least one screw hole 113*b* may be formed in the housing 101*a*, and engaging boss(es) 113*c* corresponding to the screw hole(s) 113*b* may be formed on the front cover 101*b*. For example, screws (not shown) may be engaged with the engaging bosses 113*c* through the screw holes 113*b* so that the front cover 101*b* may be mounted and fixed to the housing 101*a*. According to various embodiments of the disclosure, the optical device 105 may include at least one flange 157 formed at an edge thereof, and the screws may be engaged with the engaging bosses 113*c* through the flanges 157. In another embodiment of the disclosure, the top ends of the engaging bosses 113*c* may press the flanges 157 to bring the flanges 157 into close contact with the second surface of the housing 101*a*. For example, the optical device 105 may be accommodated and mounted inside the housing 101*a* from the second surface of the housing 101*a* by the screws or the engaging bosses 113*c*.

According to various embodiments of the disclosure, when mounted in the housing 101*a*, the guide member 102*a* may be extended from the first surface and shaped in correspondence with the contour of the user's face. According to an embodiment of the disclosure, as the guide member 102*a* may be formed of an elastic material, for example, rubber, the guide member 102*a* may be maintained in a predetermined shape and deformed by an external force. For example, when the user puts on the HMD 100, the guide member 102*a* may be deformed appropriately according to the shape of the user's face on the whole, while maintaining a gap between the housing 101*a* and the user's face.

Now, a description will be given of a structure in which the guide member 102*a* is fixed to the housing 101*a*, with further reference to FIG. 9.

Figure 9:
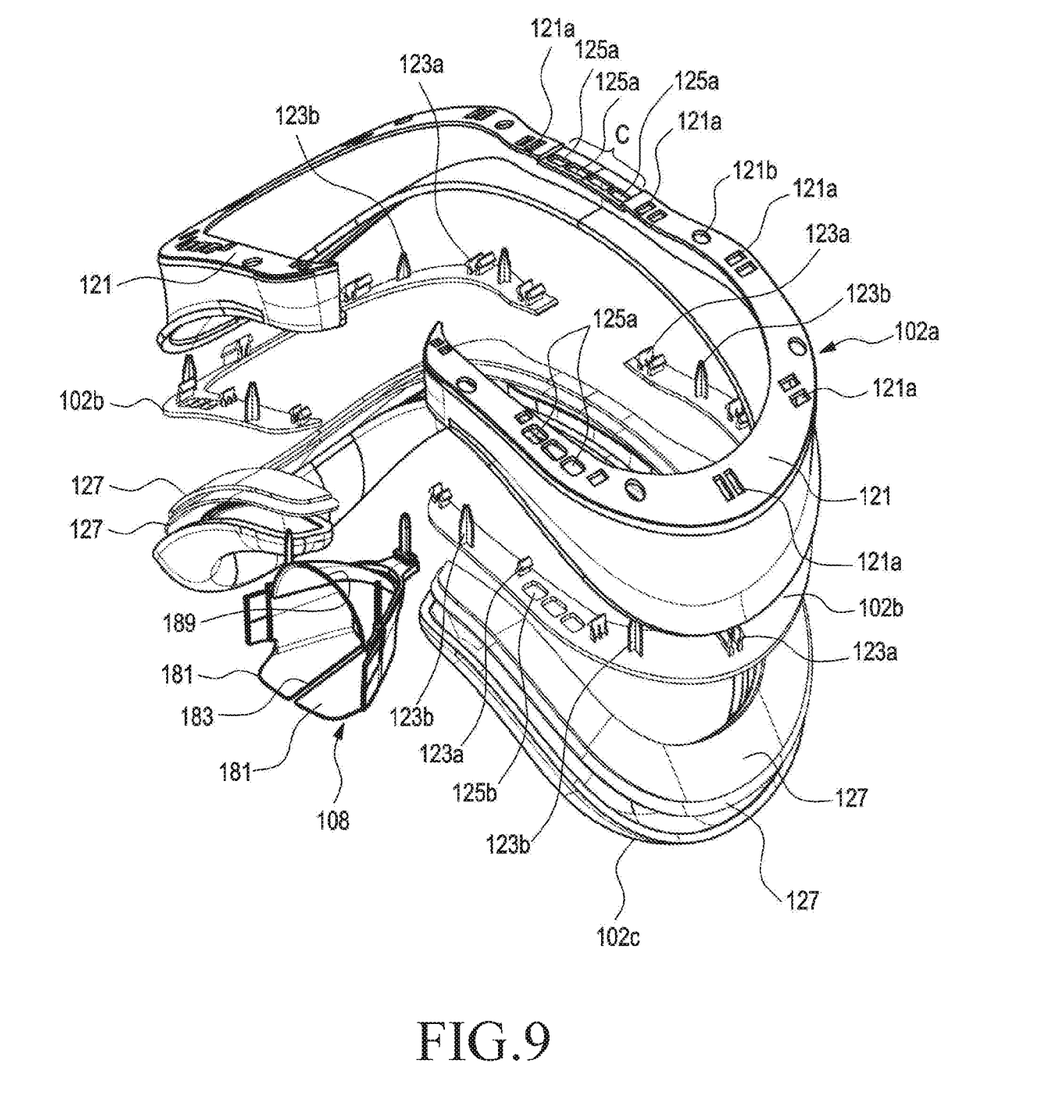
FIG. 9 is an exploded perspective view illustrating a part of a face-worn unit in an HMD according to various embodiments of the disclosure.

FIG. 9 is an exploded perspective view illustrating a part of the face-worn unit of the HMD 100 according to various embodiments of the disclosure.

According to various embodiments of the disclosure, the fixing plate 102*b* may be mounted to the housing 101*a*, with a part of the guide member 102*a* in between. For example, the fixing plate 102*b* may mount and fix the guide member 102*a* to the housing 101*a*. According to an embodiment of the disclosure, a fixing surface 111 is extended along the periphery of the first surface of the housing 101*a*, and a part of the guide member 102*a* may be formed as a fixing sheet 121 corresponding to the fixing surface 111. For example, with the fixing sheet 121 mounted on the fixing surface 111, the guide member 102*a* may be mounted and fixed to the housing 101*a*. In another embodiment of the disclosure, the fixing plate 102*b* may be shaped in correspondence with the fixing surface 111 or the fixing sheet 212 on the whole, and may be engaged with and fixed to the housing 101*a* with the fixing sheet 121 in between.

According to various embodiments of the disclosure, the face-worn unit 101 may further include at least one fixing hook 123a formed on the fixing plate 102b. In some embodiments of the disclosure, a hook hole 121a and an engaging hole (113a in FIG. 1) may be formed respectively on the guide member 102a (for example, the fixing sheet 121) and the first surface (for example, the fixing surface 111) of the housing 101a. The fixing hook 123a may be formed in a snap fit structure and engaged with the engaging hole 113a through the hook hole 121a. For example, the fixing plate 102b may be fixed to the housing 101a by the fixing hook 123a, and the fixing sheet 121 may be fixed between the fixing plate 102b and the housing 101a.

According to various embodiments of the disclosure, the face-worn unit 101 may further include a support pin 123b extended from the fixing plate 102b. The support pin 123b may penetrate the fixing sheet 121 through a dummy hole 121b formed on the fixing sheet 121, so that a part of the support pin 123b may be located inside the screw hole 113b. For example, the support pin 123b may support a screw fixed in the screw hole 113b, thereby preventing slip-off of the screw from the housing 101a.

The guide member 102a or the later-described first cushioning member 102c may define a closed space around both eyes of the user, in conjunction with the housing 101a. Body fluids (for example, sweat) produced from the user's body or the body temperature of the user may raise the temperature or humidity of this closed space, which may decrease the transparency of the lenses 155. According to various embodiments of the disclosure, the guide member 102a may include an area C corresponding to the middle of the user's forehead, and the fixing plate 102b may not be disposed in the area C. In an embodiment of the disclosure, at least one vent hole 125a may be formed in the area C. The vent hole 125a may connect with a space outside the housing 101a through a gap between the fixing surface 111 and the guide member 102a (for example, the fixing sheet 121). For example, a space surrounded by the guide member 102a or the first cushioning member 102c may connect with the space outside the housing 101a through the vent hole 125a, to thereby suppress an increase in the humidity or temperature of the space surrounded by the guide member 102a or the first cushioning member 102c. According to an embodiment of the disclosure, a step may be formed on a surface of the fixing sheet 121, facing the fixing surface 111, so that the vent hole 125a may connect with the space outside the housing 101a. For example, the area C may be formed to be stepped with respect to another part of the fixing sheet 121, to be kept apart from the fixing surface 111. In another embodiment of the disclosure, this stepped region may be formed on the fixing surface 111, and as the fixing sheet 121 is apart from the fixing surface 111 by a predetermined gap in the stepped region, the vent hole 125a may connect with the space outside the housing 101a through the gap.

According to various embodiments of the disclosure, such a vent hole may further be formed at a position other than the area C. For example, a plurality of vent holes 125a and 125b may be formed respectively on the fixing sheet 121 and the fixing plate 102b. With the fixing sheet 121 and the fixing plate 102b mounted to the housing 101a, the vent holes 125a and 125b formed respectively on the fixing sheet 121 and the fixing plate 102b may be aligned with each other and connect with the space outside the housing 101a through the gap between the fixing surface 111 and the fixing sheet 121. In some embodiments of the disclosure, stepped portions may further be formed on the fixing sheet 121 (or the fixing surface 111), at positions corresponding to the vent holes 125b formed at a different position (for example, the fixing plate 102b), similarly to formation of the area C as a stepped region.

According to various embodiments of the disclosure, the HMD 100 may further include the first cushioning member 102c on the top end of the guide member 102a, for example, on the surface of an end portion opposite to the fixing sheet 121. The first cushioning member 102c may be formed of a softer material, such as sponge, than the guide member 102a, so that when the user puts on the HMD 100, the HMD 101 may be brought into further contact with the user's face. According to an embodiment of the disclosure, the first cushioning member 102c may be attached to the guide member 102a by means of an adhesive member 127 such as a double-sided tape or Velcro.

According to various embodiments of the disclosure, the HMD 100 may further include a flexible shielding member 108. The shielding member 108 may be formed of a softer material than the guide member 102a or the first cushioning member 102c, or may be formed of the same material as the guide member 102a or the first cushioning member 102c, to a smaller thickness. The shielding member 108 may be disposed under the face-worn unit 101 in correspondence with a protruding part of the user's face, for example, the user's nose. For example, as the shielding member 108 is disposed in an area of the user's face, which is more curved than any other part thereof, pressure applied to the protruding part may be relieved.

Figure 10:
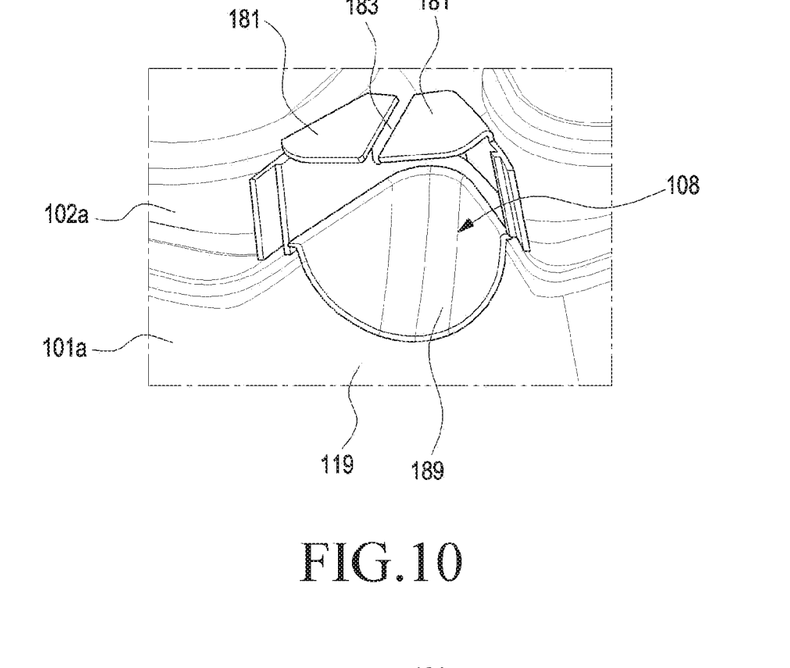
FIG. 10 is a perspective view illustrating a flexible shielding member mounted in an HMD according to various embodiments of the disclosure.

With reference to FIG. 10, the installation structure of the shielding member 108 will be described below.

FIG. 10 is a perspective view illustrating the shielding member 108 mounted in the HMD according to various embodiments of the disclosure.

Referring to FIG. 10, the shielding member 108 may include a curved portion 189 shaped in correspondence with a bent portion 119 of the housing 101a, and flap portions 181, each facing a part of the curved portion 189 and extended from the curved portion 189 to approach the other flap portion 181. The flap portions 181 may be extended to positions very close to each other, forming the same plane on the whole, so that a slit 183 is formed between the flap portions 181. When the curved portion 189 is mounted and fixed to the bent portion 183 of the housing 101a, the flap portions 181 may be located side by side with the top end of the guide member 102a, for example, the first cushioning member 102c. While the user wears the HMD 100, the flap portions 161 may be deformed and moved further toward the bent portion 119, along with a partial edge of the curved portion, and block introduction of external light to the inside (for example, the space surrounded by the guide member 102a), partially overlapped with each other. While the user wears the HMD 100, the flap portions 181 may overlap with each other and thus block introduction of light, without close contact between the flap portions 181. For example, a gap communicating with the outside may be formed even in the overlap area between the flap portions 181. This gap may connect the space surrounded by the guide member 102a to the external space. For example, while the user wears the HMD 100, the flap portions 181 may provide a similar function to that of the afore-described vent holes 125a and 125b, while blocking light.

Referring back to FIGS. 1 to 5, as the wearing band unit 104 may be mounted above the face-worn unit 101, the wearing band unit 104 may provide means for wearing the HMD 100. The wearing band unit 104 may include a frame member 104a extended in a circle on the whole and a control device 104*b* which is combined with the frame member 104*a* and form a closed curve along with the frame member 104*a*.

According to various embodiments of the disclosure, although the frame member 104*a* is extended along a circular trace on the whole, the frame member 104*a* may be disconnected at a part thereof. The control device 104*b* may form the closed curve along with the frame member 104*a* by connecting the disconnected part of the frame member 104*a*. According to an embodiment of the disclosure, the control device 104*b* may be combined slidably with the disconnected part (for example, both ends) of the frame member 104*a*. For example, the control device 104*b* may control or adjust the size of the closed curve formed along with the frame member 104*a* so that the user may stably put on the wearing band unit 104 around the user's head. The control device 104*b* may be configured with a combination of a dial and gear(s), and rotation of the dial based on the user's manipulation may switch to sliding of the frame member 104*a* on the control device 104*b*. This control mechanism will be easily understood to those skilled in the art.

According to various embodiments of the disclosure, an engaging plate 104*c* may be formed on the frame member 104*a* to provide means for mounting the wearing band unit 104 to the housing 101*a*. For example, the engaging plate 104*c* may be inserted into the first surface of the housing 101*a*, thus engaging the wearing band unit 104 with the face-worn unit 101. The engaging plate 104*c* may move back and forth within a predetermined range on the housing 101*a*. For example, with the wearing band unit 104 put around the user's head, the position of the face-worn unit 101 with respect to the wearing band unit 104 may be controlled or adjusted.

According to various embodiments of the disclosure, the wearing band unit 104 may further include a second cushioning member 141 attached to the control device 104*b*. The second cushioning member 141 may be located to face the first cushioning member 102*c* on the whole. For example, when the first cushioning member 102*c* is brought into contact with the user's surface, the second cushioning member 141 may be located facing (or contacting) the back of the user's head. With the wearing band unit 104 located around the user's head, the user may control the size of the wearing band unit 104 (for example, the size of the closed curve formed by the wearing band unit 104) by manipulating the control device 104*b*, and thus wear the HMD 100, with the first cushioning member 102*c* and/or the second cushioning member 141 closely contacting the user's body. Because the wearing band unit 104, for example, the frame member 104*a* is disposed generally around the user's head, an additional cushioning member may be provided at a part directly contacting the user's head in an actual worn state. However, because the frame member 104*a* is spaced from the user's body by the thicknesses of the second cushioning member 141 and a later-described third cushioning member 131, the additional cushioning member may not be disposed necessarily.

According to various embodiments of the disclosure, the engaging plate 104*c* may be formed at an end portion of an arm 149 extended for a predetermined length in a tilted direction from the frame member 104*b*. The tilted direction (for example, tilting angle) or length of the extended arm 149 may be set appropriately in consideration of the average head shape or size of users using the HMD 100. However, because individual users differ in head shape or head size, the users may feel different wearing sensations even though they wear the same product. The wearing sensation differences may be compensated for by controlling the size of the wearing band unit 104, the position of the face-worn unit 101 with respect to the wearing band unit 104 (for example, by advancing or receding the engaging plate 104*c*), and deforming the first cushioning member 102*c* in a worn state, using the control device 104*b*.

According to various embodiments of the disclosure, the support unit 103 may be substantially a part of the wearing band unit 104. According to an embodiment of the disclosure, the outer surface of the support unit 103 may be mounted to the inner surface of the frame member 104*a*, and an assembly groove 133 may be formed on the front surface of the support unit 103 to accommodate a part of the frame member 104*a*, thereby enhancing the outer looks or assembly quality. For example, with the support unit 103 assembled with the frame member 104*a*, the outer surface of the support unit 103 may form one plane or curved surface with the outer surface of the frame member 104*a*.

According to an embodiment of the disclosure, the HMD 100 may further include the third cushioning member 131 disposed on the inner surface of the support 103. The third cushioning member 131 may be tilted to a certain degree in a direction facing the second cushioning member 141 on the whole. With the HMD 101 worn, the third cushioning member 131 may contact and support the user's body above the face-worn surface 101. For example, the third cushioning member 131 may be supported by the user's body, at or a little above the user's forehead. Without the support unit 103, when the HMD 100 is worn, a load caused by the weight of the HMD 100 may be concentrated on the user's face (for example, the first cushioning member 102*c*) and the back of the user's head (for example, the second cushioning member 141). According to various embodiments of the disclosure, the support unit 103 may distribute the load imposed on the user's body. For example, as the support unit 103 is supported by the user's body in an actual worn state, the support unit 103 may distribute the load caused by the weight of the HMD 100 and relieve the user's fatigue resulting from long use of the HMD 100. In another embodiment of the disclosure, as the support unit 103, for example, the third cushioning member 131 contacts the user's body over a larger area, the effect of distributing the load may be increased. However, the area over which the support unit 103 contacts the user's body may be designed appropriately in consideration of the total weight and outer looks of the HMD 100.

According to various embodiments of the disclosure, the HMD may further include a speaker device 106. For example, the HMD 100, as a device that provides multimedia content to one user, may provide an audio as well as a video to the current user. In some embodiments of the disclosure, the user may operate the HMD 100 in connection to another electronic device, for example, a personal computer or an external audio device. In this case, an audio may be output through the other electronic device, not the speaker device 106.

According to various embodiments of the disclosure, a pair of speaker devices 106 may be mounted to the wearing band unit 104, for example, the frame member 104*a*, and rotate with respect to the frame member 104*a*. For example, with the HMD 100 worn, the positions of the speaker devices 106 may be controlled.

According to an embodiment of the disclosure, rotational bosses 143 connecting the speaker devices 106 to the frame member 104*a* may be mounted to the frame member 104*a*. The rotational bosses 143 may be mounted to the outer surface of the frame member 104*a* and rotate within a predetermined angle range as indicated by reference character R. The speaker devices 106, for example, later-described connection members 163 may be mounted to end portions of the rotational bosses 143 and rotate along with the rotational bosses 143 with respect to the frame member 104a as indicated by reference character R.

According to various embodiments of the disclosure, the HMD 100 may include a wiring structure that connects the speaker devices 106 to the optical device 105 (or the circuit board installed together with the optical device 105). The wiring structure is illustrated in detail in FIG. 11.

Figure 11:
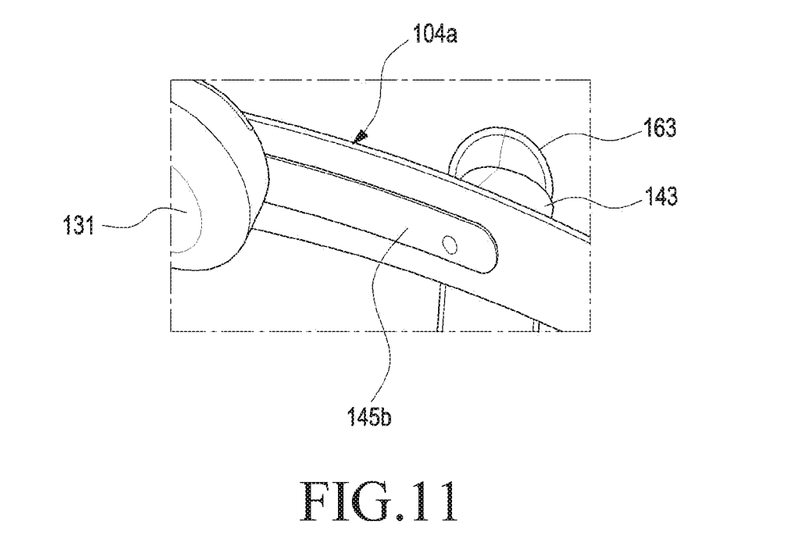
FIG. 11 is an enlarged perspective view illustrating a part of an HMD according to various embodiments of the disclosure.

FIG. 11 is an enlarged perspective view illustrating a part of the HMD 100 according to various embodiments of the disclosure.

Referring to FIG. 11, the HMD 100, for example, the wearing band unit 104 may further include wiring recesses (145a in FIG. 1) formed on the inner surface of the frame member 104a. The wiring recesses 145a may be extended from positions corresponding to the rotational bosses 143 on the inner surface of the frame member 104a, with end portions of the wiring recesses 145 covered by the support unit 103. Wires (not shown) connected to the speaker devices 106 may be arranged along the wiring recesses 145a, penetrating through the rotational bosses 143 and the frame member 104a, and extended into the housing 101a through the arm 149 or the engaging plate 104c. The wires connected to the speaker devices 106 may be electrically coupled to the circuit board inside the housing 101a. As described before, the circuit board built in the housing 101a may include a video signal processor, an audio signal processor, and so on, and the speaker devices 106 may be driven according to a signal received from the circuit board. According to various embodiments of the disclosure, the wiring recesses 145a may be covered by cover members 145b. For example, the cover members 145b shaped in correspondence with the wiring recesses 145a may be mounted on the wiring recesses 145a, thus covering and protecting electrical wirings such as conductors.

Figure 12:
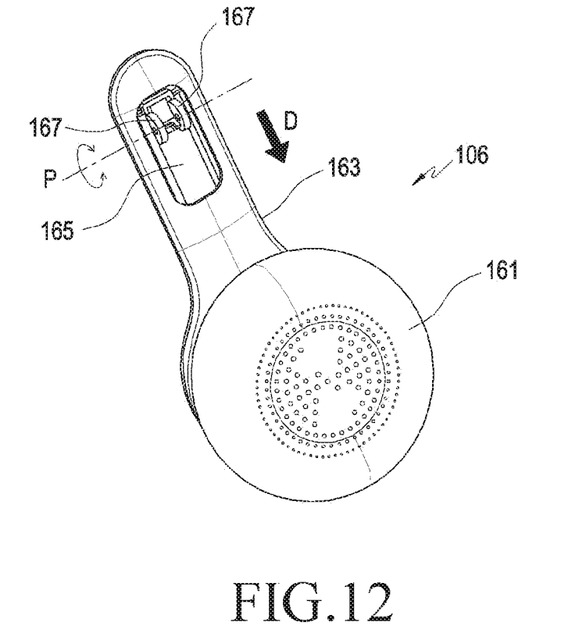
FIGS. 12 and 13 are perspective views illustrating a speaker device in an HMD according to various embodiments of the disclosure.
Figure 13:
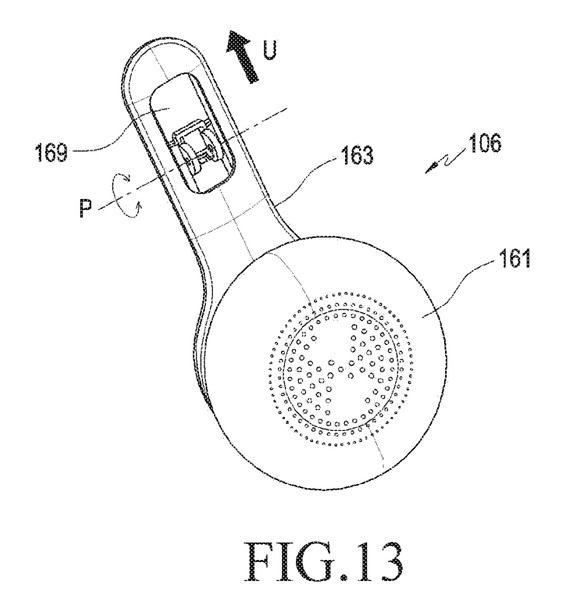

FIGS. 12 and 13 are perspective views illustrating a speaker device 106 in the HMD according to various embodiments of the disclosure.

Referring to FIGS. 12 and 13, the speaker device 106 may include a speaker module 161 and an extension member 163 extended in one direction from the speaker module 161. The extension member 163 may be rotatably engaged with one of the rotational bosses 143 as indicated by reference character P. According to an embodiment of the disclosure, the extension member 163 may include a slide member 165 engaged slidably with a surface on which the speaker module 161 is mounted and engaging members 167 formed on the slide member 165. The slide member 165 may be disposed, for example, in a slide hole 169 formed on the inner surface of the extension member 163 (for example, the surface on which the speaker module is mounted), and slidingly move within a range allowed by the slide hole 169.

According to an embodiment of the disclosure, the engaging members 167 may be formed on one surface of the slide member 165, may protrude toward the inner surface of the extension member 163, and may be rotatably engaged with an end portion of the rotational boss 143. For example, the extension member 163 or the speaker device 106 may rotate upon the engaging members 167 as indicated by reference character P. With the engaging members 167 engaged with the rotational boss 143, the speaker module 161 may move down as indicated by reference character D or move up as indicated by reference character U with respect to the slide member 165. For example, because the slide member 165 is fixed to the rotational boss, the speaker module 161 may move toward or away from the rotational boss 143 or the frame member 104a within an extension range of the slide hole 169.

According to various embodiments of the disclosure, the speaker module 161 may be engaged with the extension member, freely located in a tilted direction in a predetermined angel range with respect to the extension member 163. For example, even though the inner surface of the extension member 163 is located in parallel to a side of the user's head, the speaker module 161 may closely contact an ear inclined on the head side.

As described before, each of the rotational boss 143, the extension member 163, the slide member 165, and the speaker module 161 may move in various directions. For example, while the user wears the HMD 100, the position of the speaker module 161 may be easily controlled in correspondence with an ear of the user.

Figure 6:
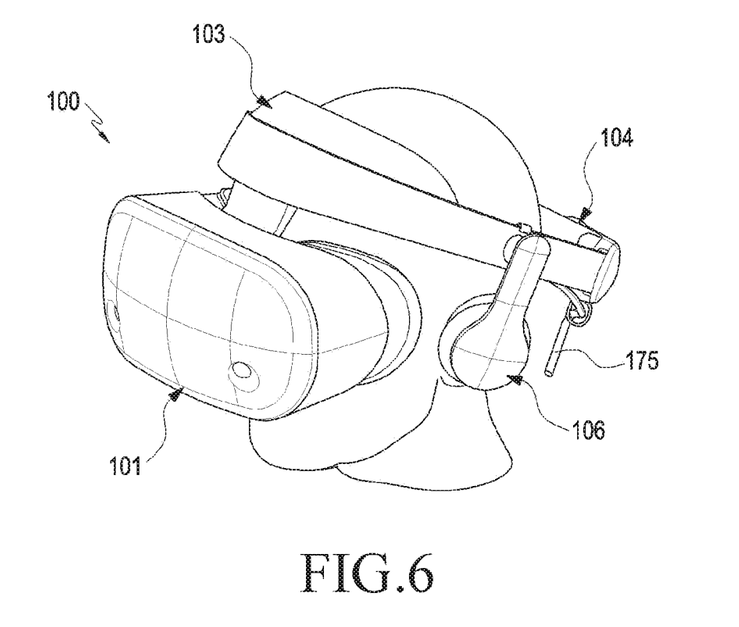
FIGS. 6 and 7 are diagrams illustrating the worn state of an HMD according to various embodiments of the disclosure.
Figure 7:
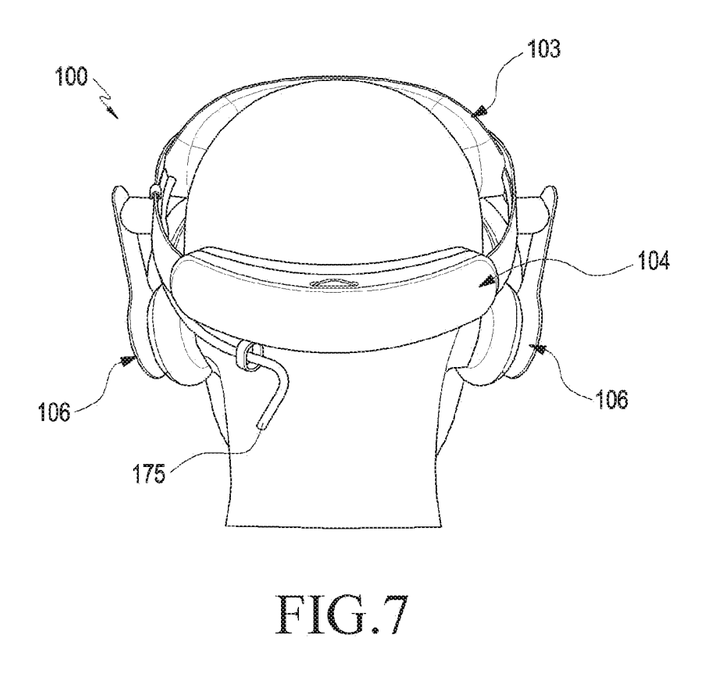

FIGS. 6 and 7 are diagrams illustrating the worn state of the HMD 100 according to various embodiments of the disclosure.

Referring to FIGS. 6 and 7, with the HMD 100 worn on the user, the face-worn unit 101 may be located in correspondence with the user's face, for example, the user's eyes, and the control device 104b may be located in correspondence with the back of the user's head. The first cushioning member 102c may be brought into close contact of the user's face around the user's eyes by adaptively controlling the control device 104b according to the shape or size of the user's head. According to an embodiment of the disclosure, with the first cushioning member 102c closely contacting the user's face, the shielding member 108, for example, the flap portions 181 may overlap with each other, closely contacting the user's nose. For example, the first cushioning member 102c and the shielding member 108 (for example, the flap portions 181) may block introduction of external light into the internal space (for example, the space defined around the user's eyes by the housing 101a, the guide member 102a, and the first cushioning member 102c). In another embodiment of the disclosure, although the flap portions 181 overlap with each other and block introduction of light, the flap portions 181 may not closely contact each other, and the inner space may connect with the outer space through the gap between the flaps 181. According to an embodiment of the disclosure, the slit 183 formed between the flap portions 181 may allow free deformation of the flap portions 181, and connect the space formed around the user's eyes to the outer space in the worn state, thereby suppressing or relieving an increase in the temperature or humidity of the inner space.

According to various embodiments of the disclosure, while the user wears the HMD 100, the support unit 103 may be supported by the user's body (for example, head) above the face-worn unit 101. While the user wears the HMD 100, the support unit 103 may distribute a load caused by the weight of the HMD 100. Without the support unit 103, the first cushioning member 102c and the second cushioning member 141 may be brought into very close contact with the user's body by tightening the wearing band unit 104, thereby preventing slip-off of the HMD 100 from the body. However, as the first cushioning member 102c and the second cushioning member 141 more closely contact the user's body, more pressure may be applied to the user and thus the user may feel tired more easily. According to various embodiments of the disclosure, even though the pressure of the first cushioning member 102c and the second cushioning member 141 is relieved, the support unit 103 may keep the HMD 100 stably worn by distributing the load of the HMD 100 toward the user's head. For example, the support unit 103 may distribute the load caused by the weight of the HMD 100 and relieve the pressure of the first cushioning member 102c and the second cushioning member 141. Accordingly, the HMD 100 according to various embodiments of the disclosure may provide wearing comfort to the user and mitigate fatigue caused by long use of the HMD 100.

According to various embodiments of the disclosure, while the user wears the HMD 100, the user may adjust the positions of the speaker devices 106 (for example, the speaker modules 161) with convenience. For example, the user may control the speaker modules 161 to positions corresponding to the ears by rotating the extension members 163 along with the rotational bosses 143 or moving up/down the speaker modules 161 with respect to the slide members 165. While not shown, the HMD 100 may further include elastic members to closely contact the speaker modules 161 to the user's ears. Because the speaker modules 161 may be freely located in a tilted direction with respect to the extension members 163, the speaker modules 161 may prevent concentration of wearing pressure on a specific part, while closely contacting the user's eyes.

According to various embodiments of the disclosure, the HMD 100 may further include a cable 175, for connection to another electronic device. The cable 175 may be connected to the circuit board built in the housing 101a and wired along the inner surface of the frame member 104a via the engaging plate 104c. According to an embodiment of the disclosure, when viewed from the outside, the cable 175 may be extended outward from the support unit 103. For example, the cable 175 may be wired through an area in which the support unit 103 is mounted. The cable 175 may include, for example, a high definition multimedia interface (HDMI) cable connected to a personal computer or the like. The HMD 100 may receive power or video data through the cable 175. In some embodiments of the disclosure, at least a part of the cable 175 may be hidden and protected inside the frame member 104a, like the wires connected to the speaker module 161.

In another embodiment of the disclosure, when the diameter of the cross-section of the cable 175 is larger than a predetermined value, it may be difficult to hide the cable 175 inside the frame member 104a. For example, when a cable of a large diameter, such as an HDMI cable for high-speed, large-capacity data signal transmission, is hidden in the frame member 104a, the thickness of the frame member 104a may also be increased. The increased thickness of the frame member 104a may lead to decreased flexibility, which may make it difficult to control a worn state (for example, to manipulate the control device 104b). For example, the cable 175 may be hidden inside the frame member 104a or extended outward from the support unit 103, in consideration of the diameter of the cable 175.

According to various embodiments of the disclosure, the HMD 100 may include at least one holder 171 and 173 to fix at least a part of the cable 175 to the wearing band unit 104a. The configuration of the holders 171 and 173 will be described with reference to FIG. 14.

Figure 14:
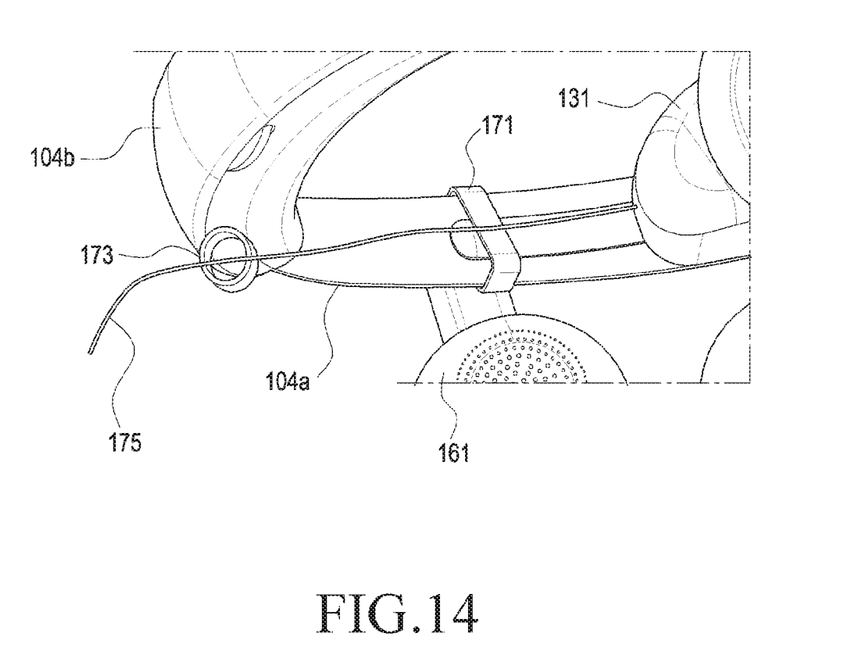
FIG. 14 is a diagram illustrating a cable shaping structure in an HMD according to various embodiments of the disclosure.

FIG. 14 is a diagram illustrating a cable shaping structure in the HMD 100 according to various embodiments of the disclosure.

According to various embodiments of the disclosure, the holders 171 and 173 may partially fix the cable 175 to the wearing band unit 104a. The user may use the HMD 100 freely without interference from the cable 175. In an embodiment of the disclosure, the holders 171 and 173 may take the form of a clip or ring. For example, the first holder 171 of the clip type may be mounted to face the inner surface of the frame member 104a, surrounding both edges of the frame member 104a. The first holder 171 may slide along a direction in which the frame member 104a is extended. When needed, a plurality of first holders 171 may be arranged and mounted. In an embodiment of the disclosure, a part of the cable 175 may be fixed onto the first holder 171 and the inner surface of the frame member 104a. For example, the first holder 171 may prevent the cable 175 from interfering with the user's body from the inside of the frame member 104a. The cable 175 may be mounted to the control device 104b via the ring-type second holder 173. The cable 175 may be extended substantially outside the HMD 100 via the second holder 173. The number or positions of first holders 171 or second holders 173 disposed on the wearing band unit 104a may be selected appropriately in consideration of the cross-section diameter of the cable 175, the size and shape of the wearing band unit 104a, and so on.

As described above, according to various embodiments of the disclosure, an HMD may include a face-worn unit worn on a user's face and configured to output an image to both eyes of the user, a wearing band unit mounted above the face-worn unit, and a support unit mounted to the wearing band unit and supported by the user's head.

The face-worn unit may include a housing including an optical device disposed therein, a guide member extended from a first surface of the housing and formed in correspondence with the contour of the user's face, and a fixing plate mounted to the housing, with a part of the guide member in between, and configured to fix the guide member to the housing.

According to various embodiments of the disclosure, the face-worn unit may further include a fixing surface formed along a periphery of the first surface of the housing on the first surface of the housing, a fixing sheet formed in correspondence with the fixing surface, as a part of the guide member, and a fixing hook formed on the fixing plate.

The fixing hook may penetrate the fixing sheet and be engaged with the housing in the fixing surface.

According to various embodiments of the disclosure, the HMD may further include at least one screw hole formed on the fixing surface, and a screw engaged with the at least one screw hole.

The optical device may be fixed in the housing by the screw.

According to various embodiments of the disclosure, the face-worn unit may further include a support pin extended from the fixing plate.

The support pin may penetrate through the fixing sheet and be located in the screw hole.

According to various embodiments of the disclosure, the HMD may further include at least one vent hole formed to penetrate through the fixing sheet and the fixing plate.

According to various embodiments of the disclosure, the at least one vent hole may connect with a space outside the housing through a gap between the fixing surface and the fixing sheet.

According to various embodiments of the disclosure, the face-worn unit may further include a first cushioning member mounted to the guide member.

According to various embodiments of the disclosure, the wearing band unit may include a frame member, and a control device engaged with the frame member to form a closed curve along with the frame member.

According to various embodiments of the disclosure, the support unit may be mounted to an inner surface of the frame member to face the control device.

According to various embodiments of the disclosure, the HMD may further include a third cushioning member mounted to an inner surface of the support unit.

According to various embodiments of the disclosure, the control device may be slidably engaged with both ends of the frame member.

According to various embodiments of the disclosure, the wearing band unit may further include rotational bosses rotatably mounted to an outer surface of the frame member, while protruding from the outer surface of the frame member, extension members extended in a direction and rotatably engaged with the rotational bosses, respectively, and speaker modules mounted to end portions of the extension members, respectively.

According to various embodiments of the disclosure, each of the extension members may include a slide hole formed along an extended direction of the extension member on a surface facing the rotational boss, a slide member slidably mounted in the slide hole, and an engaging member formed on the slide member.

The engaging member may be rotatably engaged with the rotational boss.

According to various embodiments of the disclosure, the wearing band unit may further include a wiring recess extended from a position corresponding to a rotational boss on an inner surface of the frame member, and a cover member mounted on the wiring recess.

According to various embodiments of the disclosure, the wearing band unit may further include a second cushioning member mounted to an inner surface of the control device.

According to various embodiments of the disclosure, the wearing band unit may further include at least one holder mounted to the frame member or the control device.

According to various embodiments of the disclosure, an HMD may include a face-worn unit worn on a user's face and configured to output an image to both eyes of the user, a wearing band unit mounted above the face-worn unit, and a support unit mounted to the wearing band unit and supported by the user's head.

The wearing band unit may include a frame member, a control device engaged with the frame member to form a closed curve along with the frame member, and a speaker module mounted on an outer surface of the frame member.

A wiring recess may be formed on one side surface of the frame member, and a cover member may be mounted on the wiring recess.

According to various embodiments of the disclosure, the wearing band unit may further include a holder mounted to surround both edges of the frame member and sliding on the frame member.

According to various embodiments of the disclosure, an HMD may include a face-worn unit worn on a user's face and configured to output an image to both eyes of the user, a wearing band unit mounted above the face-worn unit, a support unit mounted to the wearing band unit and supported by the user's head, and a flexible shielding member disposed in correspondence with the user's nose, under the face-worn unit.

The flexible shielding member may include a curved portion and a plurality of flap portions extended toward each other from the curved portion.

The plurality of flap portions may be extended to positions at which the flap portions are close to each other, and form a slit therebetween.

According to various embodiments of the disclosure, the flap portions may be extended to form the same plane.

While specific embodiments of the disclosure have been described above, it is apparent to those skilled in the art that many modifications can be made without departing from the scope of the disclosure.

The invention claimed is:

1. A head mounted device (HMD) comprising:
   a face-worn unit configured to be worn on a user's face and output an image to both eyes of the user,
   a wearing band unit mounted above the face-worn unit; and
   a support unit mounted to the wearing band unit and supported by the user's head,
   wherein the face-worn unit comprises:
      a housing including an optical device disposed therein;
      a fixing surface formed along a periphery of the first surface of the housing on the first surface of the housing;
      a guide member extended from a first surface of the housing and formed in correspondence with the contour of the user's face;
      a fixing sheet formed in correspondence with the fixing surface, as a part of the guide member;
      a fixing plate mounted to the housing, with a part of the guide member in between, and configured to fix the guide member to the housing; and
      a fixing hook formed on the fixing plate, and
   wherein the fixing hook penetrates the fixing sheet and is engaged with the housing in the fixing surface.

2. The HMD of claim 1, further comprising:
   at least one screw hole formed on the fixing surface; and
   a screw engaged with the at least one screw hole,
   wherein the optical device is fixed in the housing by the screw.

3. The HMD of claim 2, wherein the face-worn unit further comprises a support pin extended from the fixing plate, and
   wherein the support pin penetrates through the fixing sheet and is located in the screw hole.

4. The HMD of claim 1, further comprising at least one vent hole formed to penetrate through the fixing sheet and the fixing plate.

5. The HMD of claim 4, wherein the at least one vent hole connects with a space outside the housing through a gap between the fixing surface and the fixing sheet.

6. The HMD of claim 1, wherein the face-worn unit further comprises a first cushioning member mounted to the guide member.

7. The HMD of claim 1, wherein the wearing band unit comprises:
   a frame member; and
   a control device engaged with the frame member to form a closed curve along with the frame member.

8. The HMD of claim 7, wherein the support unit is mounted to an inner surface of the frame member to face the control device.

9. The HMD of claim 8, further comprising a third cushioning member mounted to an inner surface of the support unit.

10. The HMD of claim 7, wherein the control device is slidably engaged with both ends of the frame member.

11. The HMD of claim 7, wherein the wearing band unit further comprises:
- rotational bosses rotatably mounted to an outer surface of the frame member, while protruding from the outer surface of the frame member;
- extension members extended in a direction and rotatably engaged with the rotational bosses, respectively; and
- speaker modules mounted to end portions of the extension members, respectively.

12. The HMD of claim 11, wherein each of the extension members comprises:
- a slide hole formed along an extended direction of the extension member on a surface facing the rotational boss;
- a slide member slidably mounted in the slide hole; and
- an engaging member formed on the slide member, and wherein the engaging member is rotatably engaged with the rotational boss.

13. The HMD of claim 11, wherein the wearing band unit further comprises:
- a wiring recess extended from a position corresponding to the rotational boss on an inner surface of the frame member; and
- a cover member mounted on the wiring recess.

14. The HMD of claim 7, wherein the wearing band unit further comprises a second cushioning member mounted to an inner surface of the control device.

* * * * *